(12) United States Patent
Pan et al.

(10) Patent No.: US 7,853,094 B2
(45) Date of Patent: Dec. 14, 2010

(54) COLOR ENHANCEMENT TECHNIQUE USING SKIN COLOR DETECTION

(75) Inventors: Hao Pan, Camas, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 913 days.

(21) Appl. No.: 11/605,711

(22) Filed: Nov. 28, 2006

(65) Prior Publication Data

US 2007/0172119 A1   Jul. 26, 2007

Related U.S. Application Data

(63) Continuation-in-part of application No. 11/393,404, filed on Mar. 30, 2006.

(60) Provisional application No. 60/761,997, filed on Jan. 24, 2006.

(51) Int. Cl.
*G06K 9/40* (2006.01)
(52) U.S. Cl. .................. 382/254; 382/210; 382/260
(58) Field of Classification Search .................. None
See application file for complete search history.

(56) References Cited

U.S. PATENT DOCUMENTS

| | | |
|---|---|---|
| 3,329,474 A | 7/1967 | Harris et al. |
| 3,375,052 A | 3/1968 | Kosanke et al. |
| 3,428,743 A | 2/1969 | Hanlon |
| 3,439,348 A | 4/1969 | Harris et al. |
| 3,499,700 A | 3/1970 | Harris et al. |
| 3,503,670 A | 3/1970 | Kosanke et al. |
| 3,554,632 A | 1/1971 | Chitayat |
| 3,947,227 A | 3/1976 | Granger et al. |
| 4,012,116 A | 3/1977 | Yevick |
| 4,110,794 A | 8/1978 | Lester et al. |
| 4,170,771 A | 10/1979 | Bly |
| 4,187,519 A | 2/1980 | Vitols et al. |

(Continued)

FOREIGN PATENT DOCUMENTS

EP    0 732 669 A1    9/1996

(Continued)

OTHER PUBLICATIONS

Brian A. Wandell and Louis D. Silverstein, "The Science of Color," 2003, Elsevier Ltd, Ch. 8 Digital Color Reproduction, pp. 281-316.

(Continued)

*Primary Examiner*—Sath V Perungavoor
*Assistant Examiner*—Gregory F Cunningham
(74) *Attorney, Agent, or Firm*—Chernoff, Vilhauer, McClung & Stenzel (57) ABSTRACT

A method for enhancing the color of an image to be displayed on a display includes receiving an image having a plurality of pixels where each of the pixels has a plurality of color components. The image is filtered using a spatial filter in such a manner that the lower frequency content of the image is enhanced in such a manner that the color gamut of the lower frequency content is increased. The filtered image is modified such that the higher frequency content of the image to obtain a modified image that includes the higher frequency content and the lower frequency content.

17 Claims, 9 Drawing Sheets

The flowchart of color enhancement using skin color likelihood map

U.S. PATENT DOCUMENTS

| | | |
|---|---|---|
| 4,384,336 A | 5/1983 | Frankle et al. |
| 4,385,806 A | 5/1983 | Fergason |
| 4,410,238 A | 10/1983 | Hanson |
| 4,441,791 A | 4/1984 | Hornbeck |
| 4,516,837 A | 5/1985 | Soref et al. |
| 4,540,243 A | 9/1985 | Fergason |
| 4,562,433 A | 12/1985 | Biferno |
| 4,574,364 A | 3/1986 | Tabata et al. |
| 4,611,889 A | 9/1986 | Buzak |
| 4,648,691 A | 3/1987 | Oguchi et al. |
| 4,649,425 A | 3/1987 | Pund |
| 4,682,270 A | 7/1987 | Whitehead et al. |
| RE32,521 E | 10/1987 | Fergason |
| 4,715,010 A | 12/1987 | Inoue et al. |
| 4,719,507 A | 1/1988 | Bos |
| 4,755,038 A | 7/1988 | Baker |
| 4,758,818 A | 7/1988 | Vatne |
| 4,766,430 A | 8/1988 | Gillette et al. |
| 4,834,500 A | 5/1989 | Hilsum et al. |
| 4,862,270 A | 8/1989 | Nishio |
| 4,862,496 A | 8/1989 | Kelly et al. |
| 4,885,783 A | 12/1989 | Whitehead et al. |
| 4,888,690 A | 12/1989 | Huber |
| 4,910,413 A | 3/1990 | Tamune |
| 4,917,452 A | 4/1990 | Liebowitz |
| 4,918,534 A | 4/1990 | Lam et al. |
| 4,933,754 A | 6/1990 | Reed et al. |
| 4,954,789 A | 9/1990 | Sampsell |
| 4,958,915 A | 9/1990 | Okada et al. |
| 4,969,717 A | 11/1990 | Mallinsoh |
| 4,981,838 A | 1/1991 | Whitehead |
| 4,991,924 A | 2/1991 | Shankar et al. |
| 5,012,274 A | 4/1991 | Dolgoff |
| 5,013,140 A | 5/1991 | Healey et al. |
| 5,074,647 A | 12/1991 | Fergason et al. |
| 5,075,789 A | 12/1991 | Jones et al. |
| 5,083,199 A | 1/1992 | Borner |
| 5,122,791 A | 6/1992 | Gibbons et al. |
| 5,128,782 A | 7/1992 | Wood |
| 5,138,449 A | 8/1992 | Kerpchar |
| 5,144,292 A | 9/1992 | Shiraishi et al. |
| 5,164,829 A | 11/1992 | Wada |
| 5,168,183 A | 12/1992 | Whitehead |
| 5,187,603 A | 2/1993 | Bos |
| 5,202,897 A | 4/1993 | Whitehead |
| 5,206,633 A | 4/1993 | Zalph |
| 5,214,758 A | 5/1993 | Ohba et al. |
| 5,222,209 A | 6/1993 | Murata et al. |
| 5,224,178 A | 6/1993 | Madden et al. |
| 5,247,366 A | 9/1993 | Ginosar et al. |
| 5,256,676 A | 10/1993 | Hider et al. |
| 5,293,258 A | 3/1994 | Dattilo |
| 5,300,942 A | 4/1994 | Dolgoff |
| 5,305,146 A | 4/1994 | Nakagaki et al. |
| 5,311,217 A | 5/1994 | Guerin et al. |
| 5,313,225 A | 5/1994 | Miyadera |
| 5,313,454 A | 5/1994 | Bustini et al. |
| 5,317,400 A | 5/1994 | Gurley et al. |
| 5,337,068 A | 8/1994 | Stewart et al. |
| 5,339,382 A | 8/1994 | Whitehead |
| 5,357,369 A | 10/1994 | Pilling et al. |
| 5,359,345 A | 10/1994 | Hunter |
| 5,369,266 A | 11/1994 | Nohda et al. |
| 5,369,432 A | 11/1994 | Kennedy |
| 5,386,253 A | 1/1995 | Fielding |
| 5,394,195 A | 2/1995 | Herman |
| 5,395,755 A | 3/1995 | Thorpe et al. |
| 5,416,496 A | 5/1995 | Wood |
| 5,422,680 A | 6/1995 | Lagoni et al. |
| 5,426,312 A | 6/1995 | Whitehead |
| 5,436,755 A | 7/1995 | Gueria |
| 5,450,498 A | 9/1995 | Whitehead |
| 5,456,255 A | 10/1995 | Abe et al. |
| 5,461,397 A | 10/1995 | Zhang et al. |
| 5,471,225 A | 11/1995 | Parks |
| 5,471,228 A | 11/1995 | Ilcisin et al. |
| 5,477,274 A | 12/1995 | Akiyoshi |
| 5,481,637 A | 1/1996 | Whitehead |
| 5,537,128 A | 7/1996 | Keene et al. |
| 5,570,210 A | 10/1996 | Yoshida et al. |
| 5,579,134 A | 11/1996 | Lengyel |
| 5,580,791 A | 12/1996 | Thorpe et al. |
| 5,592,193 A | 1/1997 | Chen |
| 5,617,112 A | 4/1997 | Yoshida et al. |
| 5,642,015 A | 6/1997 | Whitehead et al. |
| 5,642,128 A | 6/1997 | Inoue |
| D381,355 S | 7/1997 | Frank-Braun |
| 5,650,880 A | 7/1997 | Shuter et al. |
| 5,652,672 A | 7/1997 | Huignard et al. |
| 5,661,839 A | 8/1997 | Whitehead |
| 5,682,075 A | 10/1997 | Bolleman et al. |
| 5,682,443 A | 10/1997 | Gouch et al. |
| 5,684,354 A | 11/1997 | Gleckman |
| 5,689,283 A | 11/1997 | Shirochi |
| 5,715,347 A | 2/1998 | Whitehead |
| 5,717,421 A | 2/1998 | Katakura et al. |
| 5,717,422 A | 2/1998 | Fergason |
| 5,729,242 A | 3/1998 | Margerum et al. |
| 5,748,164 A | 5/1998 | Handschy et al. |
| 5,751,264 A | 5/1998 | Cavallerano et al. |
| 5,754,159 A | 5/1998 | Wood et al. |
| 5,767,828 A | 6/1998 | McKnight |
| 5,767,837 A | 6/1998 | Hara |
| 5,774,599 A | 6/1998 | Muka et al. |
| 5,784,181 A | 7/1998 | Loiseaux et al. |
| 5,796,382 A | 8/1998 | Beeteson |
| 5,809,169 A | 9/1998 | Rezzouk et al. |
| 5,854,662 A | 12/1998 | Yuyama et al. |
| 5,886,681 A | 3/1999 | Walsh et al. |
| 5,889,567 A | 3/1999 | Swanson et al. |
| 5,892,325 A | 4/1999 | Gleckman |
| 5,901,266 A | 5/1999 | Whitehead |
| 5,912,651 A | 6/1999 | Bitzakidis et al. |
| 5,939,830 A | 8/1999 | Praiswater |
| 5,940,057 A | 8/1999 | Lien et al. |
| 5,959,777 A | 9/1999 | Whitehead |
| 5,969,704 A | 10/1999 | Green et al. |
| 5,978,142 A | 11/1999 | Blackham et al. |
| 5,986,628 A | 11/1999 | Tuenge et al. |
| 5,991,456 A | 11/1999 | Rahman et al. |
| 5,995,070 A | 11/1999 | Kitada |
| 5,999,307 A | 12/1999 | Whitehead et al. |
| 6,008,929 A | 12/1999 | Akimoto et al. |
| 6,024,462 A | 2/2000 | Whitehead |
| 6,025,583 A | 2/2000 | Whitehead |
| 6,043,591 A | 3/2000 | Gleckman |
| 6,050,704 A | 4/2000 | Park |
| 6,064,784 A | 5/2000 | Whitehead et al. |
| 6,067,645 A | 5/2000 | Yamamoto et al. |
| 6,079,844 A | 6/2000 | Whitehead et al. |
| 6,111,559 A | 8/2000 | Motomura et al. |
| 6,111,622 A | 8/2000 | Abileah |
| 6,120,588 A | 9/2000 | Jacobson |
| 6,120,839 A | 9/2000 | Comiskey et al. |
| 6,129,444 A | 10/2000 | Tognoni |
| 6,160,595 A | 12/2000 | Kishimoto |
| 6,172,798 B1 | 1/2001 | Albert et al. |
| 6,211,851 B1 | 4/2001 | Lien et al. |
| 6,215,920 B1 | 4/2001 | Whitehead et al. |
| 6,232,948 B1 | 5/2001 | Tsuchi |
| 6,243,068 B1 | 6/2001 | Evanicky et al. |
| 6,267,850 B1 | 7/2001 | Bailey et al. |
| 6,268,843 B1 | 7/2001 | Arakawa |
| 6,276,801 B1 | 8/2001 | Fielding |

| | | | | | | |
|---|---|---|---|---|---|---|
| 6,300,931 B1 | 10/2001 | Someya et al. | | 2002/0033783 A1 | 3/2002 | Koyama |
| 6,300,932 B1 | 10/2001 | Albert | | 2002/0036650 A1 | 3/2002 | Kasahara et al. |
| 6,304,365 B1 | 10/2001 | Whitehead | | 2002/0044116 A1 | 4/2002 | Tagawa et al. |
| 6,323,455 B1 | 11/2001 | Bailey et al. | | 2002/0057238 A1 | 5/2002 | Nitta et al. |
| 6,323,989 B1 | 11/2001 | Jacobson et al. | | 2002/0057253 A1 | 5/2002 | Lim et al. |
| 6,327,072 B1 | 12/2001 | Comiskey et al. | | 2002/0063963 A1 | 5/2002 | Whitehead et al. |
| RE37,594 E | 3/2002 | Whitehead | | 2002/0067325 A1 | 6/2002 | Choi |
| 6,359,662 B1 | 3/2002 | Walker | | 2002/0067332 A1 | 6/2002 | Hirakata et al. |
| 6,377,383 B1 | 4/2002 | Whitehead et al. | | 2002/0070914 A1 | 6/2002 | Bruning et al. |
| 6,384,979 B1 | 5/2002 | Whitehead et al. | | 2002/0093521 A1 | 7/2002 | Daly et al. |
| 6,400,436 B1 | 6/2002 | Komatsu | | 2002/0105709 A1 | 8/2002 | Whitehead et al. |
| 6,414,664 B1 | 7/2002 | Conover et al. | | 2002/0118887 A1* | 8/2002 | Gindele ...................... 382/260 |
| 6,418,253 B2 | 7/2002 | Whitehead | | 2002/0135553 A1 | 9/2002 | Nagai et al. |
| 6,424,369 B1 | 7/2002 | Adair et al. | | 2002/0149574 A1 | 10/2002 | Johnson et al. |
| 6,428,189 B1 | 8/2002 | Hochstein | | 2002/0149575 A1 | 10/2002 | Moon |
| 6,435,654 B1 | 8/2002 | Wang et al. | | 2002/0154088 A1 | 10/2002 | Nishimura |
| 6,437,921 B1 | 8/2002 | Whitehead | | 2002/0159002 A1 | 10/2002 | Chang |
| 6,439,731 B1 | 8/2002 | Johnson et al. | | 2002/0159692 A1 | 10/2002 | Whitehead |
| 6,448,944 B2 | 9/2002 | Ronzani et al. | | 2002/0162256 A1 | 11/2002 | Wardle et al. |
| 6,448,951 B1 | 9/2002 | Sakaguchi et al. | | 2002/0171617 A1 | 11/2002 | Fuller |
| 6,448,955 B1 | 9/2002 | Evanicky et al. | | 2002/0175286 A1* | 11/2002 | Murguia ................ 250/339.07 |
| 6,452,734 B1 | 9/2002 | Whitehead et al. | | 2002/0175907 A1 | 11/2002 | Sekiya et al. |
| 6,483,643 B1 | 11/2002 | Zuchowski | | 2002/0180733 A1 | 12/2002 | Colmenarez et al. |
| 6,507,327 B1 | 1/2003 | Atherton et al. | | 2002/0190940 A1 | 12/2002 | Itoh et al. |
| 6,545,677 B2 | 4/2003 | Brown | | 2003/0012448 A1 | 1/2003 | Kimmel et al. |
| 6,559,827 B1 | 5/2003 | Mangerson | | 2003/0026494 A1 | 2/2003 | Woodell et al. |
| 6,573,928 B1 | 6/2003 | Jones et al. | | 2003/0035578 A1 | 2/2003 | Dupin et al. |
| 6,574,025 B2 | 6/2003 | Whitehead et al. | | 2003/0043394 A1 | 3/2003 | Kuwata et al. |
| 6,590,561 B1 | 7/2003 | Kabel et al. | | 2003/0048393 A1 | 3/2003 | Sayag |
| 6,597,339 B1 | 7/2003 | Ogawa | | 2003/0053689 A1 | 3/2003 | Watanabe et al. |
| 6,608,614 B1 | 8/2003 | Johnson | | 2003/0072496 A1 | 4/2003 | Woodell et al. |
| 6,624,828 B1 | 9/2003 | Dresevic et al. | | 2003/0090455 A1 | 5/2003 | Daly |
| 6,657,607 B1 | 12/2003 | Evanicky et al. | | 2003/0107538 A1 | 6/2003 | Asao et al. |
| 6,680,834 B2 | 1/2004 | Williams | | 2003/0108245 A1* | 6/2003 | Gallagher et al. ............ 382/228 |
| 6,690,383 B1 | 2/2004 | Braudaway et al. | | 2003/0112391 A1 | 6/2003 | Jang et al. |
| 6,697,110 B1 | 2/2004 | Jaspers et al. | | 2003/0128337 A1 | 7/2003 | Jaynes et al. |
| 6,700,559 B1 | 3/2004 | Tanaka et al. | | 2003/0132905 A1 | 7/2003 | Lee et al. |
| 6,753,876 B2 | 6/2004 | Brooksby et al. | | 2003/0142118 A1 | 7/2003 | Funamoto et al. |
| 6,788,280 B2 | 9/2004 | Ham | | 2003/0169247 A1 | 9/2003 | Kawabe et al. |
| 6,791,520 B2 | 9/2004 | Choi | | 2003/0179221 A1 | 9/2003 | Nitta et al. |
| 6,803,901 B1 | 10/2004 | Numao | | 2003/0197709 A1 | 10/2003 | Shimazaki et al. |
| 6,816,141 B1 | 11/2004 | Fergason | | 2004/0012551 A1 | 1/2004 | Ishii |
| 6,816,142 B2 | 11/2004 | Oda et al. | | 2004/0037460 A1* | 2/2004 | Luo et al. .................... 382/165 |
| 6,816,262 B1 | 11/2004 | Slocum et al. | | 2004/0037560 A1* | 2/2004 | Mells ........................... 398/76 |
| 6,828,816 B2 | 12/2004 | Ham | | 2004/0041782 A1 | 3/2004 | Tachibana |
| 6,834,125 B2 | 12/2004 | Woodell et al. | | 2004/0051724 A1 | 3/2004 | Elliott et al. |
| 6,846,098 B2 | 1/2005 | Bourdelais et al. | | 2004/0057017 A1 | 3/2004 | Childers et al. |
| 6,856,449 B2 | 2/2005 | Winkler et al. | | 2004/0239587 A1 | 12/2004 | Murata et al. |
| 6,862,012 B1 | 3/2005 | Funakoshi et al. | | 2004/0263450 A1 | 12/2004 | Lee et al. |
| 6,864,916 B1 | 3/2005 | Nayar et al. | | 2005/0073495 A1 | 4/2005 | Harbers et al. |
| 6,885,369 B2 | 4/2005 | Tanahashi et al. | | 2005/0088403 A1 | 4/2005 | Yamazaki |
| 6,891,672 B2 | 5/2005 | Whitehead et al. | | 2005/0105147 A1* | 5/2005 | Gruzdev et al. ............. 358/518 |
| 6,900,796 B2 | 5/2005 | Yasunishi et al. | | 2005/0123214 A1* | 6/2005 | Takahira ..................... 382/266 |
| 6,932,477 B2 | 8/2005 | Stanton | | 2005/0157298 A1 | 7/2005 | Evanicky et al. |
| 6,954,193 B1 | 10/2005 | Andrade et al. | | 2005/0175227 A1* | 8/2005 | Paschalakis ................. 382/128 |
| 6,975,369 B1 | 12/2005 | Burkholder | | 2005/0190164 A1 | 9/2005 | Velthoven et al. |
| 7,002,546 B1 | 2/2006 | Stuppi et al. | | 2005/0200295 A1 | 9/2005 | Lim et al. |
| 7,113,163 B2 | 9/2006 | Nitta et al. | | 2005/0225561 A1 | 10/2005 | Higgins et al. |
| 7,113,164 B1 | 9/2006 | Kurihara | | 2005/0225574 A1 | 10/2005 | Brown et al. |
| 7,123,222 B2 | 10/2006 | Borel et al. | | 2005/0259064 A1 | 11/2005 | Sugino et al. |
| 7,161,577 B2 | 1/2007 | Hirakata et al. | | 2006/0071936 A1 | 4/2006 | Leyvi et al. |
| 7,697,782 B2* | 4/2010 | Pan ............................ 382/275 | | 2006/0104508 A1 | 5/2006 | Daly et al. |
| 2001/0005192 A1 | 6/2001 | Walton et al. | | 2006/0120598 A1 | 6/2006 | Takahashi et al. |
| 2001/0013854 A1 | 8/2001 | Ogoro | | 2006/0208998 A1 | 9/2006 | Okishiro et al. |
| 2001/0024199 A1 | 9/2001 | Hughes et al. | | 2006/0280333 A1* | 12/2006 | Ikeda et al. ................. 382/103 |
| 2001/0035853 A1 | 11/2001 | Hoelen et al. | | 2007/0009167 A1* | 1/2007 | Dance et al. ................ 382/254 |
| 2001/0038736 A1 | 11/2001 | Whitehead | | 2007/0052636 A1 | 3/2007 | Kalt et al. |
| 2001/0048407 A1 | 12/2001 | Yasunishi et al. | | 2008/0025634 A1 | 1/2008 | Border et al. |
| 2001/0052897 A1 | 12/2001 | Nakano et al. | | 2008/0088560 A1 | 4/2008 | Bae et al. |
| 2002/0003520 A1 | 1/2002 | Aoki | | | | |
| 2002/0003522 A1 | 1/2002 | Baba et al. | | FOREIGN PATENT DOCUMENTS | | |
| 2002/0008694 A1 | 1/2002 | Miyachi et al. | | | | |
| 2002/0031257 A1* | 3/2002 | Kato ........................ 382/165 | EP | 0 829 747 A1 | 3/1998 | |

| | | |
|---|---|---|
| EP | 0 606 162 B1 | 11/1998 |
| EP | 0912047 | 4/1999 |
| EP | 0 963 112 A1 | 12/1999 |
| EP | 1061499 | 12/2000 |
| EP | 1168243 | 1/2002 |
| EP | 1 202 244 A1 | 5/2002 |
| EP | 1 206 130 A1 | 5/2002 |
| EP | 1 313 066 A1 | 5/2003 |
| EP | 1 316 919 A2 | 6/2003 |
| EP | 1 453 002 | 9/2004 |
| EP | 1 453 030 A1 | 9/2004 |
| FR | 2 611 389 | 2/1987 |
| GB | 2 388 737 | 11/2003 |
| JP | 64-10299 | 1/1989 |
| JP | 1-98383 | 4/1989 |
| JP | 3-71111 | 3/1991 |
| JP | 3-198026 | 8/1991 |
| JP | 5-66501 | 3/1993 |
| JP | 5-80716 | 4/1993 |
| JP | 5-273523 | 10/1993 |
| JP | 5-289044 | 11/1993 |
| JP | 6-247623 | 9/1994 |
| JP | 6-313018 | 11/1994 |
| JP | 7-121120 | 5/1995 |
| JP | 9-244548 | 9/1997 |
| JP | 10-508120 | 8/1998 |
| JP | 11-052412 | 2/1999 |
| JP | 11-146219 | 5/1999 |
| JP | 2002-099250 | 4/2000 |
| JP | 2000-206488 | 7/2000 |
| JP | 2000-275995 | 10/2000 |
| JP | 2000-321571 | 11/2000 |
| JP | 2001-142409 | 5/2001 |
| JP | 2002-83293 | 3/2002 |
| JP | 2002-091385 | 3/2002 |
| JP | 2003-196653 | 7/2003 |
| JP | 2003-204450 | 7/2003 |
| JP | 2003-230010 | 8/2003 |
| JP | 3523170 | 2/2004 |
| JP | 2004-294540 | 10/2004 |
| KR | 10-2004-0084777 | 10/2004 |
| TW | 406206 | 9/2000 |
| WO | WO 91/15843 | 10/1991 |
| WO | WO 93/20660 | 10/1993 |
| WO | WO 96/33483 | 10/1996 |
| WO | WO 98/08134 | 2/1998 |
| WO | WO 00/75720 | 12/2000 |
| WO | WO 01/69584 | 9/2001 |
| WO | WO 02/03687 | 1/2002 |
| WO | WO 02/079862 | 10/2002 |
| WO | WO 03/077013 | 9/2003 |
| WO | WO 2004/013835 | 2/2004 |

OTHER PUBLICATIONS

Paul E. Debevec and Jitendra Malik, "Recovering High Dynamic Range Radiance Maps from Photographs," Proceedings of SIGGRAPH 97, Computer Graphics Proceedings, Annual Conference Series, pp. 369-378 (Aug. 1997, Los Angeles, California). Addison Wesley, Edited by Turner Whitted. ISBN 0-89791-896-7.

Dicarlo, J.M. and Wandell, B. (2000), "Rendering high dynamic range images," in Proc. IS&T/SPIE Electronic Imaging 2000. Image Sensors, vol. 3965, San Jose, CA, pp. 392-401.

Kuang, J., Yamaguchi, H., Johnson, G.M. and Fairchild, M.D. (2004), "Testing HDR image rendering algorithms (Abstract)," in Proc. IS&T/SID Twelfth Color Imaging Conference: Color Science, Systems, and Application, Scottsdale, AR, pp. 315-320.

Durand, F. and Dorsey, J. (2002), "Fast bilateral filtering for the display of high dynamic-range images," in Proc. ACM SIGGRAPH 2002, Annual Conference on Computer Graphics, San Antonia, CA, pp. 257-266.

Kang, S.B., Uyttendaele, M., Winder, S. and Szeliski, R. (2003), "High Dynamic Range Video," ACM Transactions on Graphics 22(3), 319-325.

Youngshin Kwak and Lindsay W. MacDonald, "Accurate Prediction of Colours on Liquid Crystal Displays," Colour & Imaging Institute, University of Derby, Derby, United Kingdom, IS&T/SID Ninth Color Imaging Conference, pp. 355-359, Nov . 2001.

Fumiaki Yamada and Yoichi Taira, "An LED backlight for color LCD," IBM Research, Tokyo Research Laboratory, 1623-14, Shimotsuruma, Yamato, Kanagawa-ken 242-8502, Japan, IDW'00, pp. 363-366, IDW 2000.

A.A.S. Sluyterman and E.P. Boonekamp, "18.2: Architectural Choices in a Scanning Backlight for Large LCD TVs," Philips Lighting, Bld. HBX-p, PO Box 80020, 5600 JM Eindhoven, The Netherlands, SID 05 Digest, pp. 996-999, May 2005.

Fumiaki Yamada, Hajime Nakamura, Yoshitami Sakaguchi, and Yoichi Taira,"52.2: Invited Paper: Color Sequential LCD Based on OCB with an LED Backlight," Tokyo Research Laboratory, IBM Research, Yamato, Kanagawa, Japan, SID 00 Digest, pp. 1180-1183, May 2000.

Ngai-Man Cheung, et al., "Configurable entropy coding scheme for H.26L," ITU-Telecommunications Standardization Sector, Study Group 16 Question 6 Video Coding Experts Group (VCEG), Twelfth Meeting: Eibsee, Germany, Jan. 9-12, 2001, pp. 1-11.

T. Funamoto, T. Kobayashi, T. Murao, "High-Picture-Quality Technique for LCD televisions: LCD-AI," AVC Products Development Center, Matsushita Electric Industrial, Co., Ltd., 1-1 Matsushita-cho, Ibaraki, Osaka 567-0026 Japan, 2 pages, IDW Nov. 2000.

Steven L. Wright, et al., "Measurement and Digital compensation of Crosstalk and Photoleakage in High-Resolution TFTLCDs," IBM T.J. Watson Research Center, PO Box 218 MS 10-212, Yorktown Heights, NY 10598, pp. 1-12, 1999.

* cited by examiner

The overall block diagram of the proposed algorithm

The 3D plot of a 33x33x33 skin color lookup table (left) and three 2D slices of the 3D LUT with Blue=0, 128, and 255, respectively (right).

The block diagram of the image-driven nonlinear lowpass filter

FIG. 5

The flowchart of color enhancement using skin color likelihood map

FIG. 6

The input-output relationship of a coring process

FIG. 7

An example of the interface of the possible embodiment with two independent sliders ("Flesh Tone Saturation" and "Non-Flesh Tone Saturation") for separately adjusting the saturation levels of skin colors and non-skin colors, respectively.

FIG. 8

The flowchart of color gamut mapping applied to the lowpass image using skin color likelihood map

FIG. 9

COLOR ENHANCEMENT TECHNIQUE USING SKIN COLOR DETECTION

CROSS-REFERENCE TO RELATED APPLICATIONS

This application is a continuation-in-part of U.S. patent application Ser. No. 11/393,404 filed Mar. 30, 2006, which claims the benefit of U.S. Provisional App. No. 60/761,997, filed Jan. 24, 2006.

BACKGROUND OF THE INVENTION

The present invention relates to image enhancement.

The HSV (hue, saturation, value), or HSB (hue, saturation, brightness) model of the color space model facilitates a more intuitive modification of the colors of an image than changing the colors of an image based directly upon the modification of three primary colors model, i.e. R, G, and B. The RGB color space has the shape of a cube while the HSV color space has the shape of a hexagonal cone. The HSV cone is a non-linear transformation of the RGB cube and at times it is referred to as a perceptual model. 'Perceptual' means the attributes that are more akin to the way in which human-beings think of color.

HSV model facilitates modification of the range or gamut of an RGB display device using the perceptually based variables, i.e. hue, saturation and value/brightness. The HSV model is based on polar coordinates (r, e, z) rather than Cartesians coordinates used in the RGB model. Hue or tint, is represented as an angle about the z axis, ranging from 0° through 360°. Vertices of the hexagon are separated by 60° increment. Red is at H=0°, Yellow at H=60', Green at H=120', Cyan at H=180', Blue at H=240', and Magenta at H=300'. Complementary colors are 180° spaced apart from each other. Distance from the z axis represents saturation (S): the amount of color present. S typically varies from 0 to 1. It is represented in this model as the ratio of the purity of a hue. S=1 represents maximum purity of this hue. A hue is said to be one-quarter purity at S=0.25. At S=0, the gray scale is resulted. V, value of HSV, varies from 0 at the apex of the hexcone to 1 at the bottom of the hexcone. V=0 represents blackness. With V=1, color has his maximum intensity. When V=1 and S=1, we have the pure hue. Whiteness is obtained at the location of V=1 and S=0. Other color spaces have similar behavior and include $YC_bC_r$ and LAB, in which the color place is Cartesian separable rather than polar separable.

Most existing current color enhancement techniques typically boosts saturation of colors while keeping the colors' hue substantially unchanged. In the hue-saturation color wheel such as the one shown in FIG. 1, a typical color enhancement technique moves colors outward on the radial direction as shown by the arrows. Essentially, the color enhancement algorithm increases the input images' color gamut by increasing the saturation of the pixels. The term "color gamut" can also be used to describe the available image of colors capable of being displayed by a given display. The color is determined by the display's primaries.

The techniques used to enhance the color enhancement of an image are based upon modification of individual pixels. When the color of a pixel is enhanced to a new color, the conversion from the old color to the new color for each pixel is a predetermined fixed adjustment for the entire image or for the entire video.

By way of example, televisions have built-in color enhancement techniques to enhance unsaturated colors in certain content and let viewers set their color preferences. Because the human eye is very sensitive to the skin color, it is important for a color enhancement technique to render skin colors properly. It is also desirable for a color enhancement technique to separately adjust skin colors and non-skin colors using different characteristics.

Some color enhancement techniques have the capability of protecting skin colors. These techniques are typically are pixel-based. When the color of a pixel is enhanced to a new color, the conversion from the old color to the new color is fixed, and is not affected by other pixels. Because pixel-based color enhancement techniques with skin color protection cannot overcome the issue that the colors of skin and non-skin are highly overlapped, these techniques cannot effectively separately enhance skin and non-skin, and thus they can only protect all skin colors in the image not to be enhanced.

Figure 2:
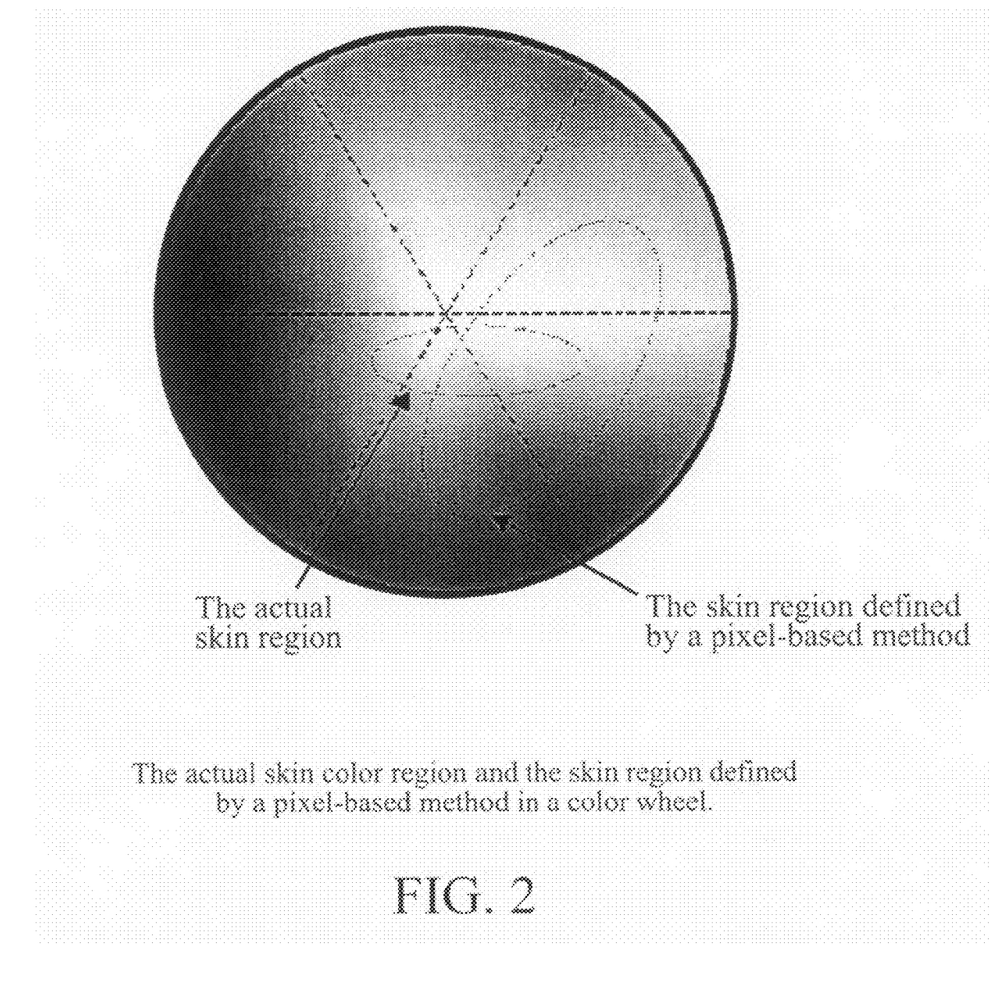
FIG. 2 illustrates the actual skin color region and the skin region defined by a pixel based technique in a color wheel.

The pixel-based algorithms do not work effectively. Specifically, to avoid generating visible contouring artifacts in the areas of an image where skin and neighboring non-skin colors are mixed, both the skin color region in the color space and the gradual transition region between the skin color region and the non-skin color region have to be set very wide. Typically, the skin color and transition regions cover nearly half of the color gamut, as illustrated in FIG. 2. On the other hand, some true skin colors are missed in the skin color region and therefore remain unprotected. Consequently, many non-skin colors are improperly protected while many skin colors are improperly enhanced by the enhancement techniques.

DETAILED DESCRIPTION OF PREFERRED EMBODIMENT

Figure 1:
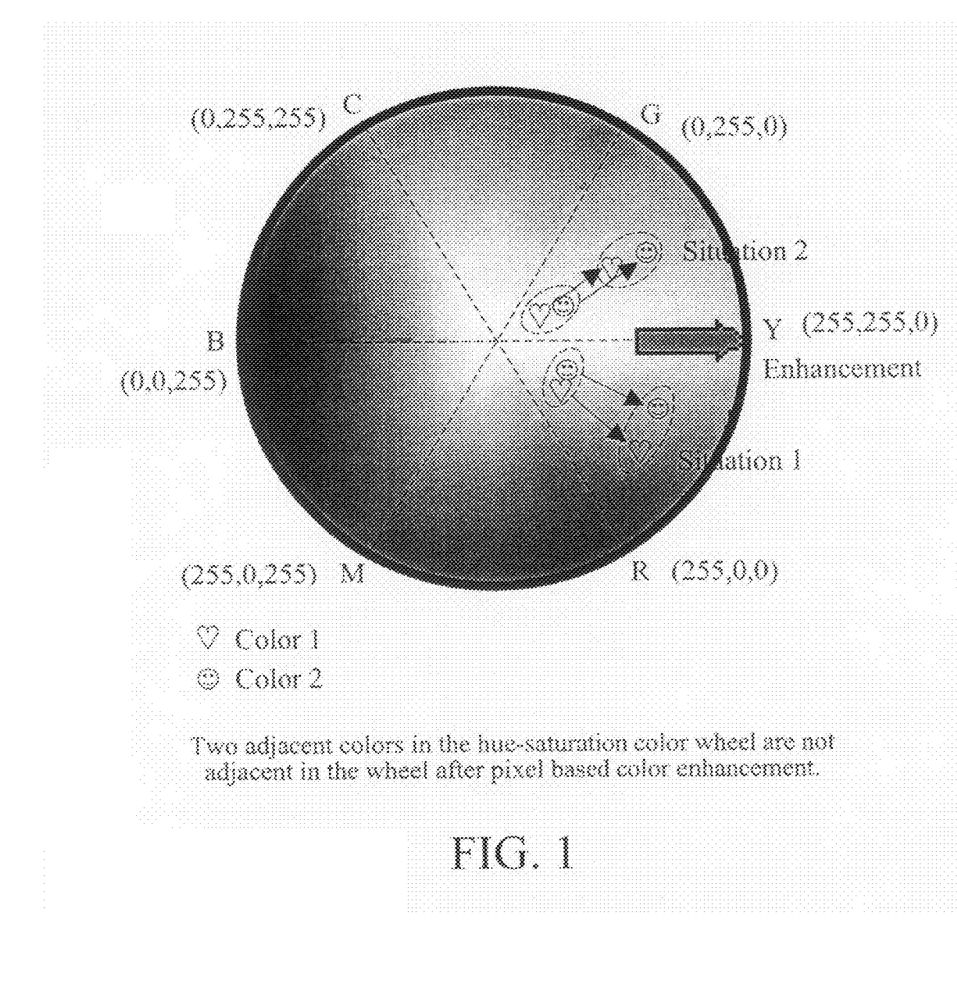
FIG. 1 illustrates two adjacent colors in the hue-saturation color wheel that are not adjacent in the wheel after color enhancement.

An observation was made that a typical pixel based color enhancement technique results in two similar colors before enhancement being modified to different values that are significantly less similar after enhancement. FIG. 1 illustrates two different situations. Situation 1 illustrates the case when two colors are similar but have different hues, and situation 2 illustrates the case when two colors have the same hue and similar saturations.

In both situations, the two colors are close to each other in the color plane before color enhancement. The two colors are spaced significantly apart from each other in the color plane after color enhancement, indicating that the two enhanced colors are less similar after enhancement than they were before enhancement.

Single pixel-based color enhancement techniques also enhance artifacts while it enhances colors. The pixels in spatial flat areas of the non-enhanced image tend to have similar colors, and the differences among the similar colors are not very visible to the viewer. Because the pixel-based color enhancement techniques enlarge the differences of similar colors, the resulting differences of the enhanced image may become very visible, and consequently a flat area of the image before enhancement may not be very flat anymore after enhancement. Specifically, pixel-based color enhancement techniques are prone to amplifying noise that is otherwise generally unobservable in the flat area to become readily observable after color enhancement. Also, the pixel-based color enhancement technique tends to amplify and generate quantization artifacts in the smooth regions before enhancement that become relatively noisy after enhancement. In addition, amplifying compression artifacts that are generally unobservable in the non-enhanced image become generally noticeable after enhancement. The compression artifacts include, for example, contours, which are typically due to insufficient bit-depth, blocky artifacts, which are common for block-based compression schemes, and ringing artifacts, which are due to loss of high frequency caused by compression.

In order to reduce the artifacts resulting from image enhancement, a modified technique may incorporate spatial information with the color enhancement. In addition, the spatial information may be obtained using multi-channel or two-channel decomposition of the image. More specifically, the preferred technique may decomposes an image into a base image and a residual image. The base image may incorporate a pixel-based color enhancement technique. The color enhanced base image and the non-enhanced residual image are then combined back into a single image.

The color enhancement technique for the base image results in an increased color gamut for an image, which would tend to increase the noise and artifacts that are in the image if they were occurring in the base image. However, noise and artifacts are usually contained in the high pass band, and are not enhanced in this technique since the residual image is not enhanced, or otherwise not enhanced to as great of an amount. Accordingly, it is desirable to reduce the generation of artifacts while enhancing the color of the image with an increased color gamut. While decreasing the generation of artifacts in the increased color gamut image, the technique should also preserve image details which are generally high frequency in nature and akin to 'noise'. The technique does not necessarily need to increase the color gamut, but may rather be a redistribution of the colors in the color space.

For example, in the case that the display has a larger color gamut than the input image, it is desirable to modify the image in such a manner that the color gamut (or distribution) of the skin-tone regions and the non-skin-tone regions are separately modified in a different manner. In some cases, this will involve reducing the color gamut or otherwise modifying the color distribution in such a manner for the skin-tone regions and non-skin-tone regions so that when they are modified by the display during rending the colors appear as desired.

For example, in the case that the display has the same or substantially the same color gamut as the input image, it may be desirable to modify the image in such a manner that the color gamut (or distribution) of the skin-tone regions and the non-skin-tone regions are separately modified in a different manner. In many cases, it is desirable to increase the saturation of the non-skin tone colors while not increasing the saturation (or to a lesser extent) of the skin-tone colors. In this manner, the skin-tone regions have a more realistic appearance. Alternatively, in some cases, it is desirable to decrease the saturation of the non-skin tone colors while increasing the saturation (or to a greater extent) of the skin-tone colors.

In general it is desirable to use a blending of the modification between the skin-tone regions and the non-skin-tone regions to reduce artifacts that would have otherwise been created at the boundary.

Figure 3:
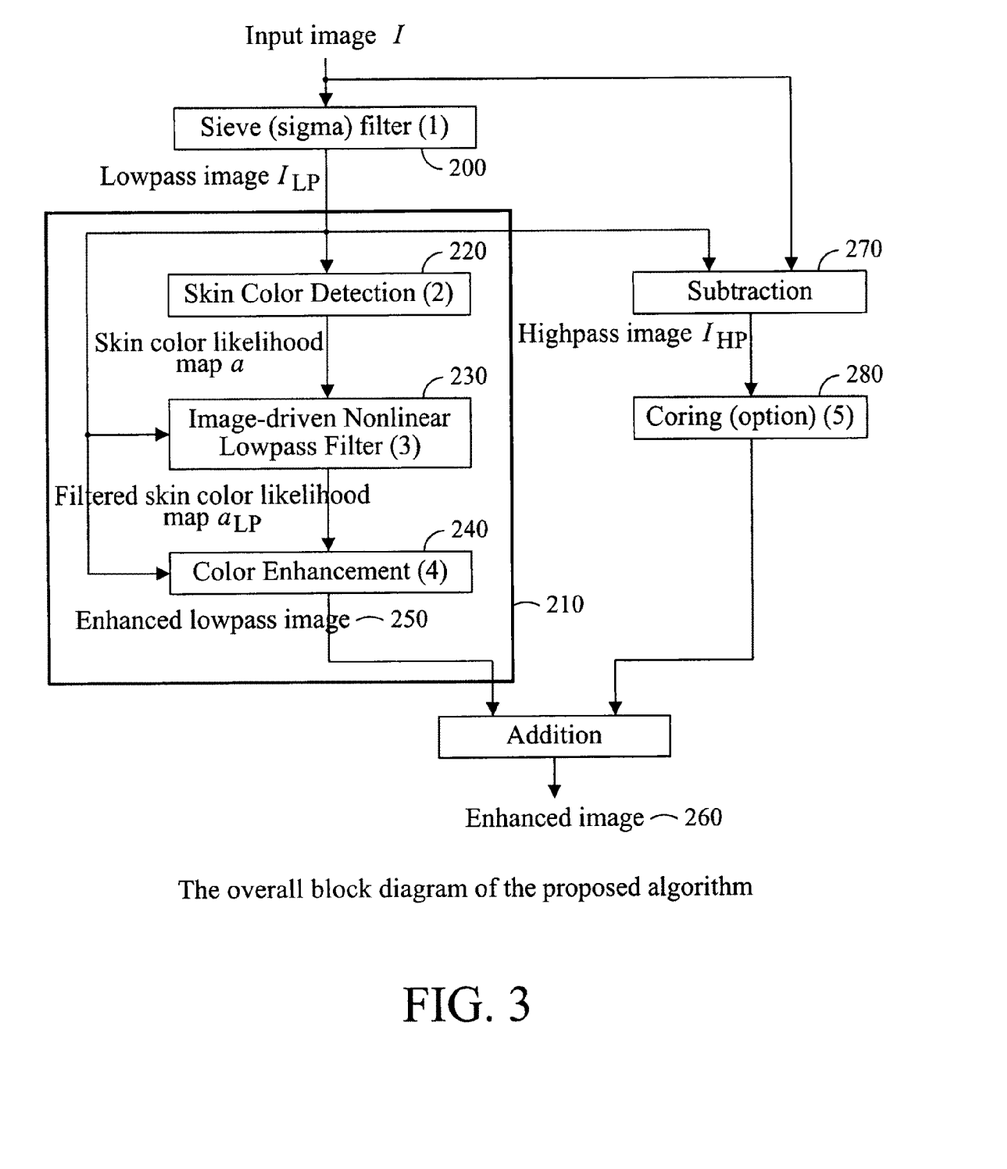
FIG. 3 illustrates a block diagram of the proposed technique.

The overall block-diagram of the preferred system is shown in FIG. 3. To reduce enhancing noise and artifacts while enhancing colors, the technique uses two-channel decomposition. Specifically, the input image is first decomposed into lowpass (e.g., base) and highpass (e.g., residual) images by preferably a sigma filter 200. The lowpass image, containing few details or artifacts, goes through the enhancement path 210. The enhancement path 210 has skin color detection 220, skin color likelihood map filtering 230 and color enhancement 240. The highpass image $I_{HP}$ is formed by subtraction 270 of the lowpass image $I_{LP}$ from the original image. The highpass image, containing details, noise, and artifacts, does not go through the enhancement path 210 (or goes through with a reduced amplitude) and will be added back to the color enhanced lowpass image 250 to generate the enhanced image 260. Therefore, the noise in the highpass imaged is not enhanced in the same manner. In addition, the highpass image can go through coring processing 280 to reduce noise and artifacts. The details of each component in the block-diagram are discussed as follows.

The sigma filter 200 decomposes the input image into the lowpass and highpass images. A suitable sigma filter is published by Lee (J. S. Lee, "Digital image enhancement and noise filtering by use of local statistics," in *IEEE Trans. Pattern Analysis and Machine Intelligence*, Vol. PAMI-2, No. 2, pp. 165-168, March, 1980). The sigma filter utilizes a 1-D or 2-D rectangular window, where the current pixel I(x,y) is at the center of the window. The sigma filter compares all the pixels I(i,j) in the window with the central pixel I(x,y), and averages those pixels whose value differences with the central pixel I(x,y) is within a threshold T. Because this filter drops pixels that are not less than the threshold, one may refer to this as a sigma filter. The sigma filter is a nonlinear filter. Mathematically, the output of the sigma filter, $I_{LP}(x,y)$, is calculated by $$I_{LP}(x, y) = \frac{\sum_{(i,j) \in E \& |I(i,j)-I(x,y)|<T} I(i, j)}{N(x, y)} \quad (1)$$

where E is the window; N(x,y) is the count of the pixels in E that satisfy the condition of |I(i,j)–I(x,y)|<T. The parameters of the sigma filter, the widow E and the threshold T, are preferably chosen empirically.

The sigma filter generates the lowpass image $I_{LP}$, and the highpass image is obtained by subtraction 270. Because the sigma filter is a smoothing filter preserving sharp edges, the lowpass image generated by a sigma filter contains few details but contains sharp edges, and the highpass image contains details/noises/artifacts but few sharp edges.

The skin color detection 220 uses a 3D lookup table (LUT) to generate a skin color likelihood map. The three dimensions of the LUT are R, G and B. Each element of the LUT is a scale from 0 to 1 to indicate the likelihood that a color belongs to skin colors. The LUT is built by training, using training set where skin colors are manually segmented. Every pixel of the lowpass image can be given a skin color likelihood score by the LUT and the whole image forms a skin color likelihood map a.

Figure 4:
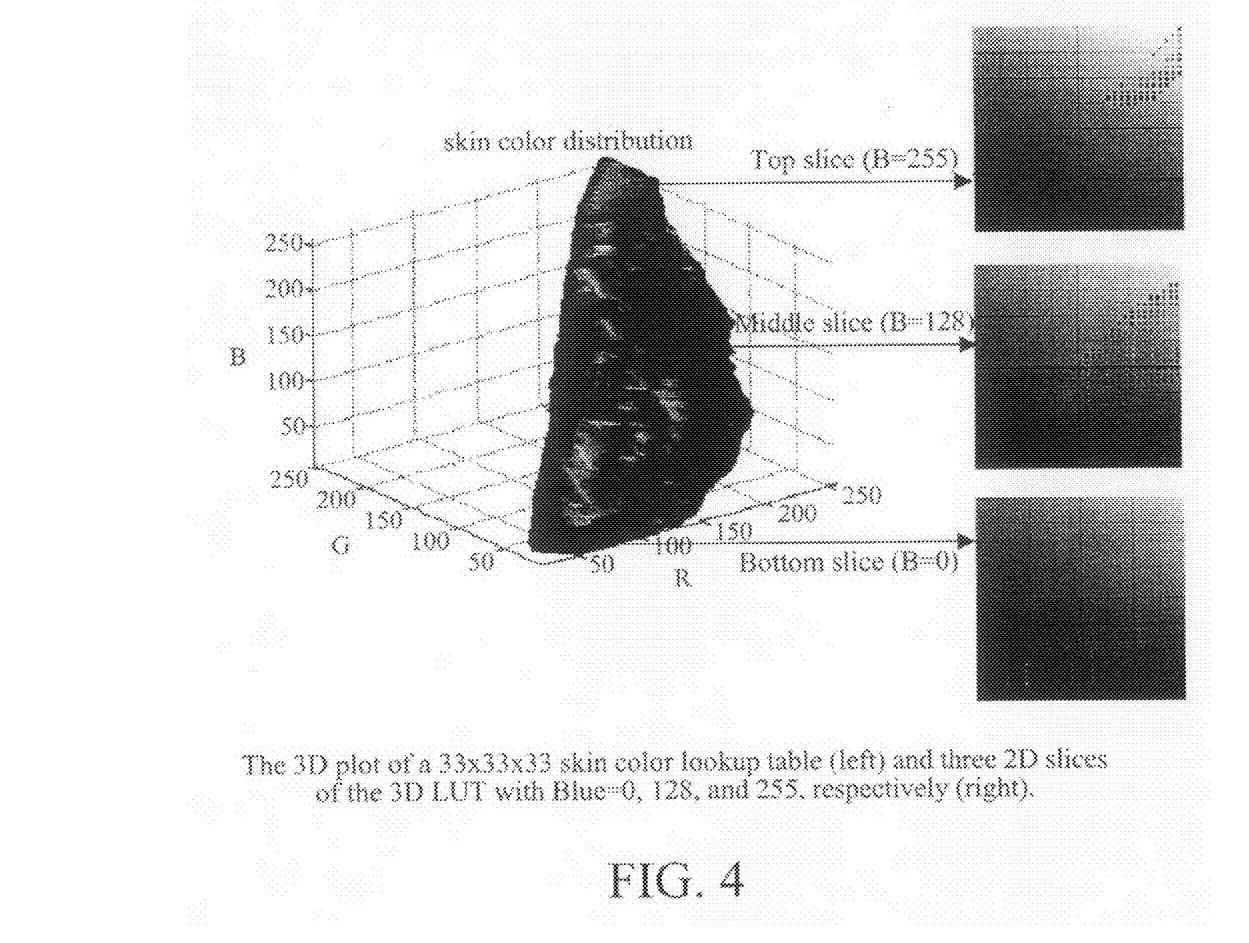
FIG. 4 illustrates a look up table of skin color.

Assuming that R, G and B inputs are 8 bits, the size of 3D LUT is 256×256×256, which is costly to implement directly in expensive hardware. A LUT with that size is also tedious to train. Therefore, 33×33×33 3D LUT is preferably used. The 33 levels of each dimension may be 0, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 255. A 3D interpolation algorithm, such as tri-linear interpolation, is used to fill all the missing points in the 3D 256×256×256 grid. The 33×33×33 LUT is illustrated in FIG. 4.

The skin colors and non-skin colors are highly overlapped in the sense that any skin colors are not exclusively used by skins and non-skin colors are not exclusively used by non-skin objects either. Consequently, the skin color likelihood map of the input image generated by the above LUT can not avoid misses.

To correct some misses in the skin color likelihood map, one may use spatial information by applying an image-driven nonlinear lowpass filter to the skin color likelihood map in the preferred algorithm. The filter is motivated by the following two facts:

(a) The pixels that are spatially close likely have similar skin color likelihood scores;

(b) The pixels that are close in the color space likely have similar skin color likelihood scores.

Mathematically, the image-driven nonlinear lowpass filter may be defined as $$a_{LP}(x, y) = \frac{\sum_{(i,j) \in E \,\&\, |R(i,j)-R(x,y)|<T \,\&\, |G(i,j)-G(x,y)|<T \,\&\, |B(i,j)-B(x,y)|<T} a(i, j)}{N(x, y)} \quad (2)$$

In the above equation, E is the window; $a(i, j)$ is the skin color likelihood score at $(i, j)$. $R(i, j)$, $G(i, j)$, and $B(i, j)$ define the colors at $(i, j)$. The spatial proximity is defined by window E. The pixels in E are considered to be spatially close to the pixel at $(x, y)$. The color-space proximity is defined by threshold T. The pixels' R, G and B differences with the pixel at $(x, y)$ are all below T are considered to be close in the color space. $N(x,y)$ is the count of the qualified pixels in E that are both spatially close and color-wisely close.

Figure 5:
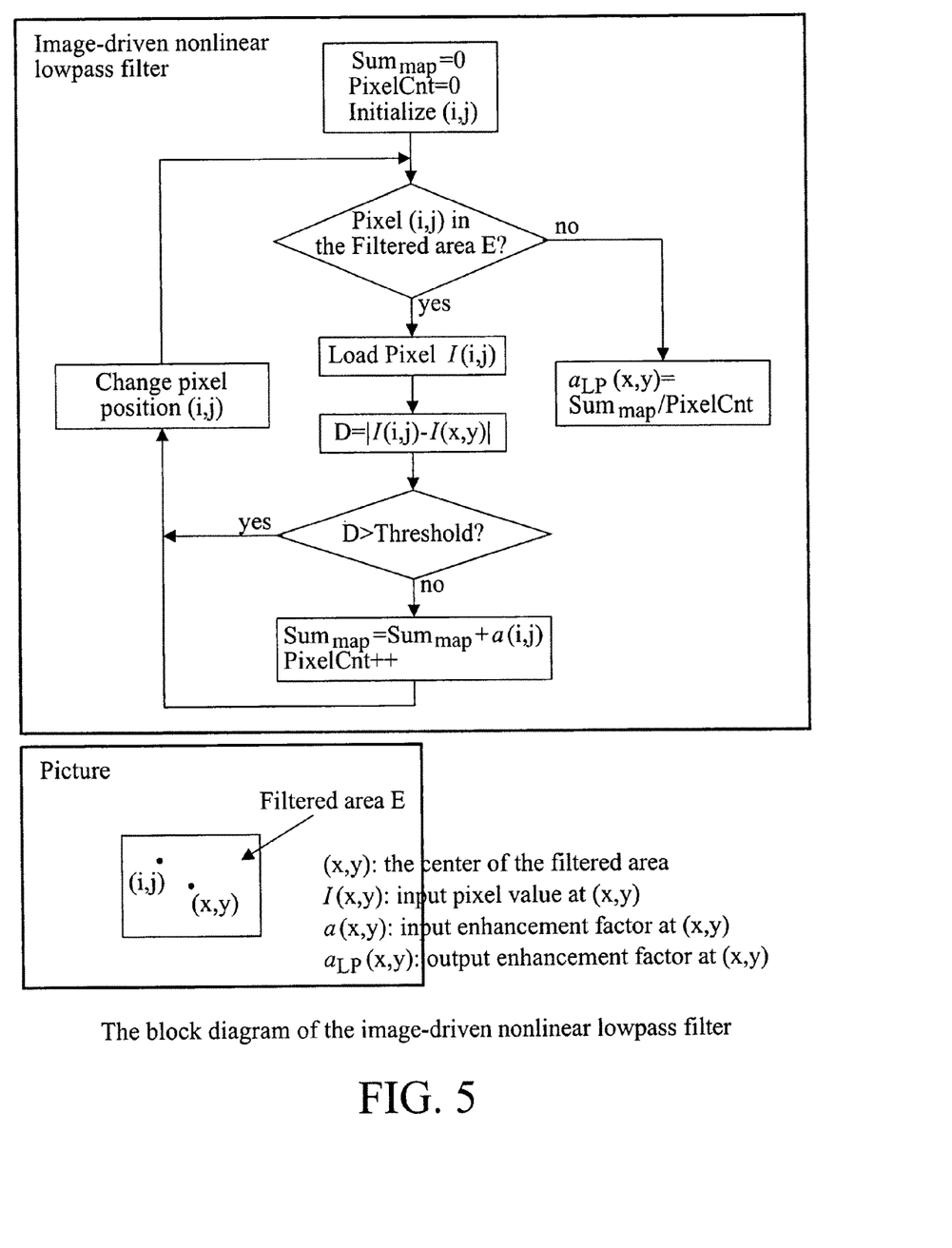
FIG. 5 illustrates a block diagram of an image driven non-linear low pass filter.

The image-driven nonlinear lowpass filter is a variation of the sigma filter. The input of the filter is the skin color likelihood map of the image, but the selection of pixels for averaging is based on the image itself. The spatially close and color-wisely close pixels tend to have the similar skin color likelihood, and their likelihood scores, not there image colors, are averaged. The flow-chart of this filter is shown in FIG. 5.

Figure 6:
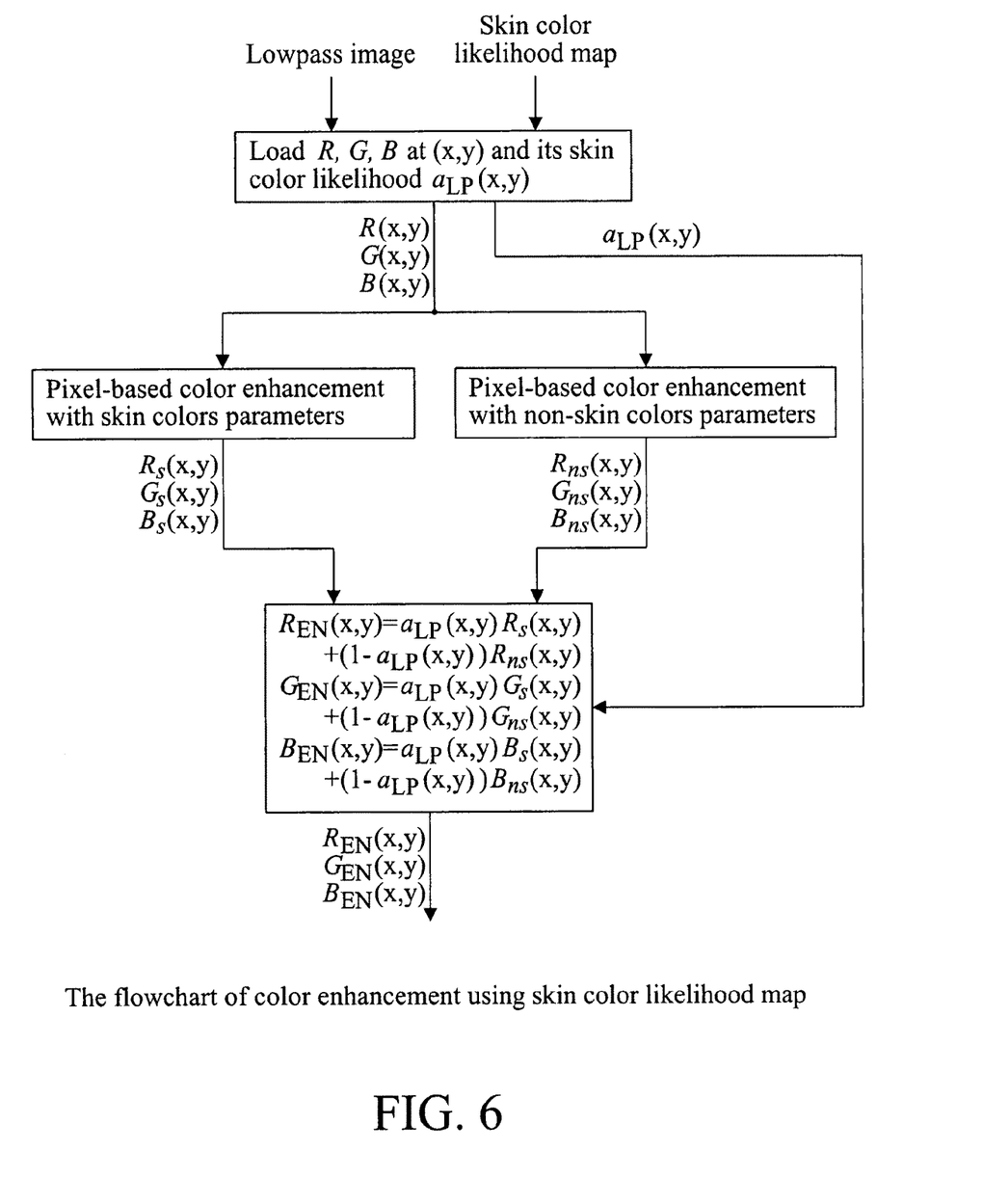
FIG. 6 illustrates a flow chart of color enhancement using skin color likelihood map.

A pixel with colors defined by $[R(x, y), G(x, y), B(x, y)]$ in the lowpass image is enhanced using a pixel-based color enhancement algorithm with two different sets of parameters, one set for skin colors, and the other for non-skin colors. Two enhanced results from two different parameter sets, $[R_s(x, y), G_s(x, y), B_s(x, y)]$ and $[R_{ns}(x, y), G_{ns}(x, y), B_{ns}(x, y)]$ are mixed linearly according to its skin color likelihood score $a_{LP}(x, y)$ to $[R_{EN}(x, y), G_{EN}(x, y), B_{EN}(x, y)]$. Specifically, the mixing equations may be $$R_{EN}(x,y) = a_{LP}(x,y)R_s(x,y) + (1-a_{LP}(x,y))R_{ns}(x,y)$$

$$G_{EN}(x,y) = a_{LP}(x,y)G_s(x,y) + (1-a_{LP}(x,y))G_{ns}(x,y)$$

$$B_{EN}(x,y) = a_{LP}(x,y)B_s(x,y) + (1-a_{LP}(x,y))B_{ns}(x,y)$$

The block-diagram is shown in FIG. 6. Any pixel-based technique can be used for color enhancement.

Figure 7:
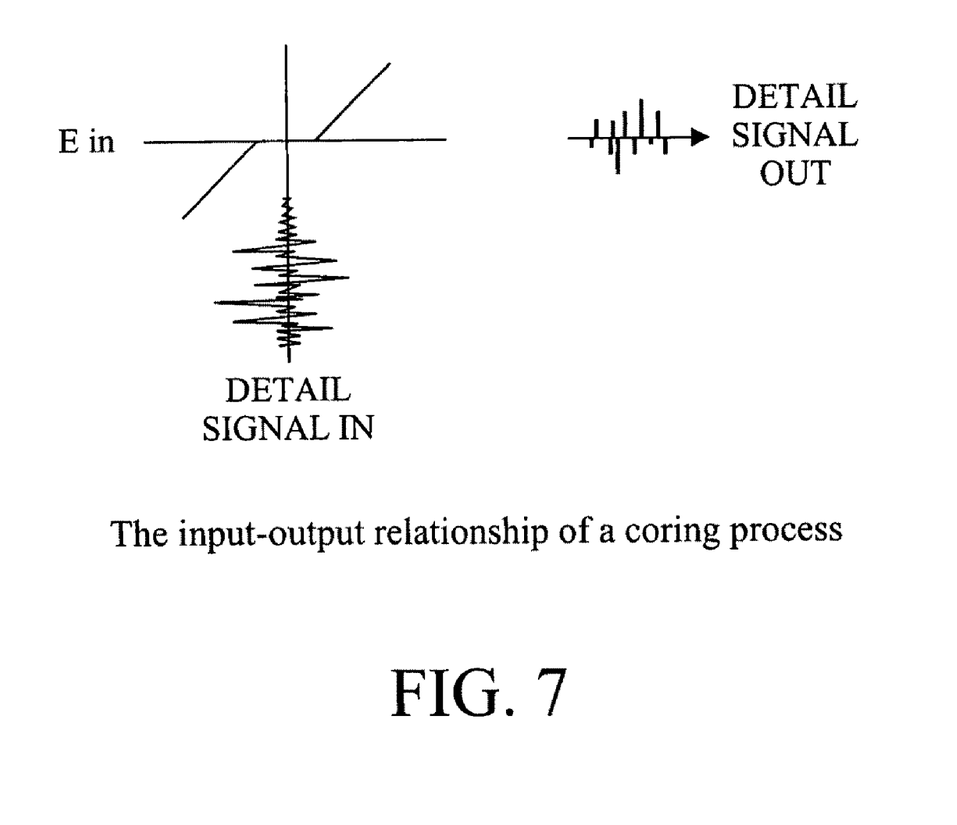
FIG. 7 illustrates an input-output relationship of a coring process.

The highpass image contains details, noise and artifacts. As an option, the highpass image can go through a coring process 280 to reduce noise and artifacts. The input-output relationship of a coring processing is shown in FIG. 7.

Figure 8:
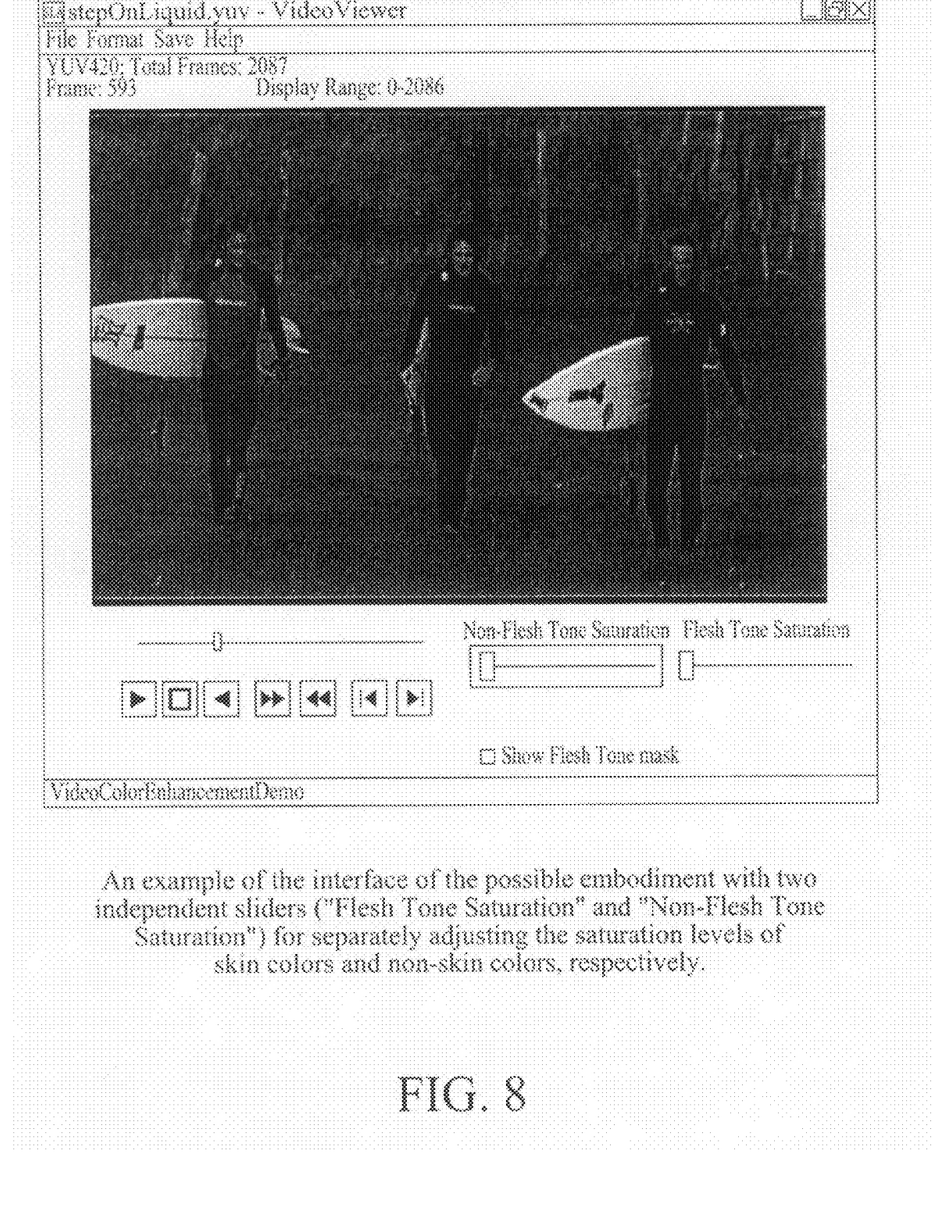
FIG. 8 illustrates a user interface.

One example of the user interface of the embodiment of the preferred embodiment is shown in FIG. 8. The interface has two sliders to let viewers separately adjust the saturation levels of the skin colors ("Flesh Tone Saturation") and non-skin colors ("Non-flesh Tone Saturation"). Although this example only shows the separate saturation adjustments, the preferred embodiment allows other separate parameter adjustments as well, such as hue and/or brightness.

The same idea in the color enhancement technique may be used in a color gamut mapping technique to map pictorial data from a small color gamut to a big color gamut. Next-generation LCD TVs may feature a big color gamut such as the NTSC gamut. On the other hand, in the foreseeable future, the contents will still be in the HDTV/sRGB format, which is 70% of the NTSC gamut in the XYZ color space. Directly displaying the RGB values defined in the small HDTV/sRGB gamut on the TV with the big NTSC gamut will damage skin colors, resulting in red color shadows, color clipping, etc.

Figure 9:
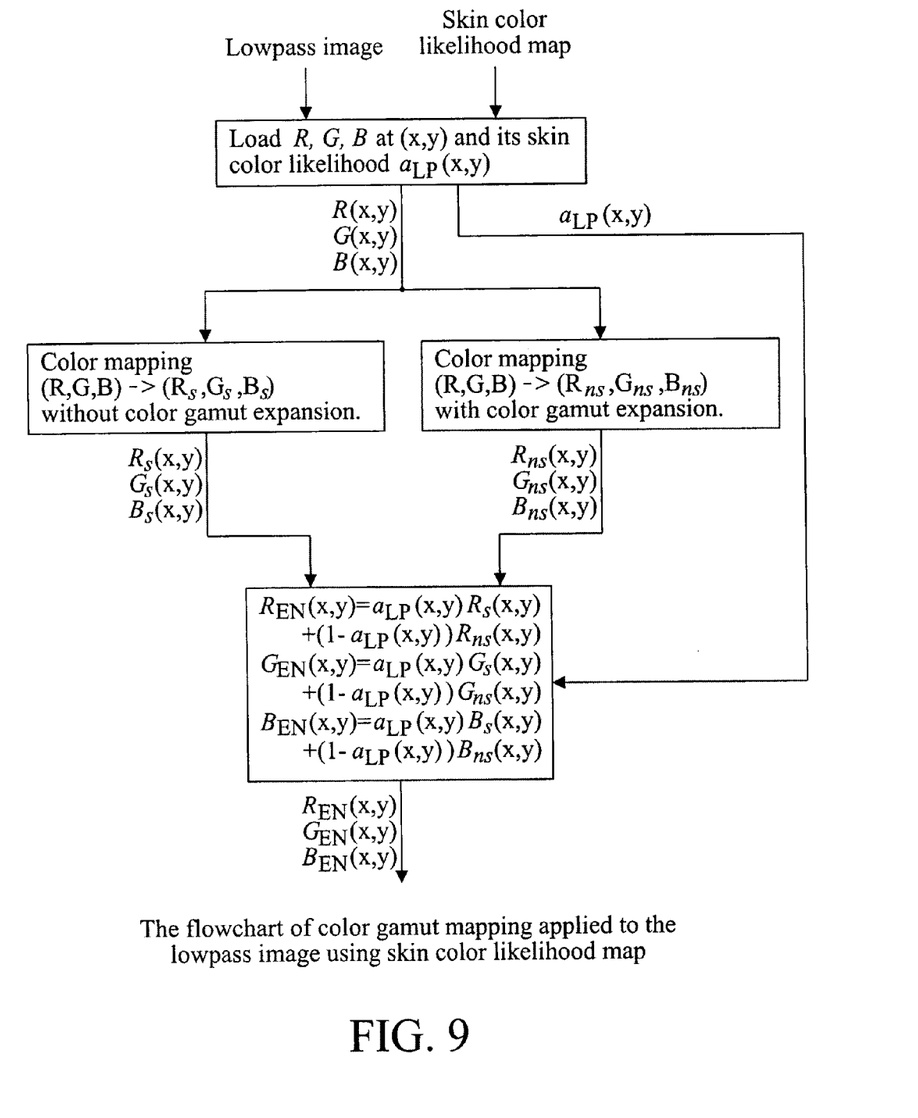
FIG. 9 illustrates a color gamut mapping technique.

As the color enhancement technique, the color gamut mapping algorithm decomposes the input image into lowpass and highpass images using the same sigma filter. The same skin color likelihood map is generated and processed in the color gamut mapping algorithm. The color mapping is only applied to the lowpass mage as the color enhancement algorithm. Specifically, first, a pixel with colors defined by $[R(x, y), G(x, y), B(x, y)]$ in the lowpass image is mapped using two sets of parameters, one parameter set preserving colors, and the other parameter set expanding colors to the extra area of the big color gamut. Then, the two mapped results $[R_s(x, y), G_s(x, y), B_s(x, y)]$ and $[R_{ns}(x, y), G_{ns}(x, y), B_{ns}(x, y)]$ are combined linearly (or non-linearly) according to its skin color likelihood score $a_{LP}(x, y)$ to $[R_{EN}(x, y), G_{EN}(x, y), B_{EN}(X, Y)]$.

Specifically, the mixing equations still are $$R_{EN}(x,y) = a_{LP}(x,y)R_s(x,y) + (1-a_{LP}(x,y))R_{ns}(x,y)$$

$$G_{EN}(x,y) = a_{LP}(x,y)G_s(x,y) + (1-a_{LP}(x,y))G_{ns}(x,y)$$

$$B_{EN}(x,y) = a_{LP}(x,y)B_s(x,y) + (1-a_{LP}(x,y))B_{ns}(x,y)$$

The block-diagram of lowpass image processing is shown in FIG. 9.

Finally, the highpass image is added back to generate the color-gamut-mapped image.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for enhancing the color of an image to be displayed on a display comprising:
   (a) a processor receiving an image having a plurality of pixels where each of said pixels has a plurality of color components;
   (b) a processor filtering said image with a spatial filter to define skin regions displaying a person's skin, wherein said skin regions are enhanced such that the distribution of the colors in said skin regions is modified in a first manner, and wherein said spatial filter has a first component that associates pixels of said image with respective scores that each represent the likelihood that the pixel has a skin tone, and a second component that filters said respective scores;

(c) a processor filtering said image with a filter to enhance regions of said image other than said skin regions such that the distribution of the colors in said regions of said image other than said skin regions are modified in a second manner;

(d) whereby said image is modified to include said filtered regions of said image other than said skin regions and said filtered skin regions.

2. The method of claim 1 wherein said modified image is displayed on a display, where said display has a larger color gamut than said received image, wherein said filtering said image results in a compressing of the distribution of colors in said skin regions.

3. The method of claim 1 wherein the edge regions of said skin regions are filtered to create a graduated transition between said skin regions and said regions of said image other than said skin regions.

4. The method of claim 1 wherein said modified image is displayed on a display, where said display has substantially the same color gamut as said received image, wherein said modification distributes colors in said skin regions such that when rendered by said display the colors of said image other than said skin regions are increased in saturation, while the colors of said skin regions are not increased in saturation to the same extent as said colors of said image other than said skin regions.

5. The method of claim 1 wherein said skin regions are defined by a spatial low pass filter.

6. The method of claim 1 wherein said spatial filter is a sigma filter.

7. The method of claim 1 wherein said image is received from the output of a sigma filer filter.

8. The method of claim 1 wherein said spatial filter includes a region defined around a pixel of interest.

9. The method of claim 8 wherein said spatial filter determines pixels within said region that are sufficiently similar to said pixel of interest.

10. The method of claim 1 wherein said filtering includes a look-up table to further define said skin regions.

11. The method of claim 1 wherein said filtering includes a spatial characteristic that determines whether proximate pixels have skin-tones.

12. The method of claim 1 wherein said filtering includes a color space characteristic that determines if proximate pixels have skin-tones.

13. The method of claim 1 wherein said image is separated into a base image of low-frequency content and a residual image of high-frequency content, where said residual image is not filtered with said spatial filter and is not filtered with said filter.

14. The method of claim 13 wherein said lower frequency content is separated by edges.

15. The method of claim 13 wherein said higher frequency content includes high frequency details, noise, and artifacts.

16. The method of claim 1 wherein said filter includes a threshold.

17. The method of claim 16 wherein said threshold is based upon the content of said image.

* * * * *